(12) United States Patent
Champion et al.

(10) Patent No.: US 8,247,095 B2
(45) Date of Patent: Aug. 21, 2012

(54) ENERGY ASSISTED DISCRETE TRACK MEDIA WITH HEAT SINK

(75) Inventors: Eric J. Champion, Fremont, CA (US); Adam F. Torabi, Pleasanton, CA (US); Matthew R. Gibbons, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 211 days.

(21) Appl. No.: 12/545,692

(22) Filed: Aug. 21, 2009

(65) Prior Publication Data

US 2011/0043941 A1 Feb. 24, 2011

(51) Int. Cl.
*G11B 5/66* (2006.01)
(52) U.S. Cl. .......... 428/831; 428/836
(58) Field of Classification Search .......... None
See application file for complete search history.

(56) References Cited

U.S. PATENT DOCUMENTS

| | | | |
|---|---|---|---|
| 5,314,745 A | 5/1994 | Okumura | |
| 5,981,017 A | 11/1999 | Agarwal et al. | |
| 6,139,936 A | 10/2000 | Weiss | |
| 6,372,367 B1 | 4/2002 | Matsuda et al. | |
| 6,667,118 B1 | 12/2003 | Chang et al. | |
| 6,703,099 B2 | 3/2004 | Belser | |
| 6,731,446 B2 | 5/2004 | Ikeda et al. | |
| 7,067,207 B2 | 6/2006 | Kamata et al. | |
| 7,155,732 B2 | 12/2006 | Rausch et al. | |
| 7,394,622 B2 | 7/2008 | Gage et al. | |
| 7,459,096 B2 | 12/2008 | Imamura et al. | |
| 7,741,229 B2 * | 6/2010 | Suwa et al. ............ 438/737 |
| 2004/0101713 A1 | 5/2004 | Wachenschwanz et al. | |
| 2004/0240327 A1 | 12/2004 | Sendur et al. | |
| 2005/0157597 A1 * | 7/2005 | Sendur et al. ........ 369/13.55 |
| 2005/0163962 A1 | 7/2005 | Kawato et al. | |
| 2006/0121318 A1 | 6/2006 | Gage et al. | |
| 2006/0154110 A1 * | 7/2006 | Hohlfeld et al. ........ 428/823 |
| 2006/0210838 A1 | 9/2006 | Kamimura et al. | |
| 2006/0226116 A1 * | 10/2006 | Haginoya et al. ........ 216/41 |
| 2007/0224339 A1 * | 9/2007 | Kamata et al. ........ 427/130 |
| 2007/0279791 A1 | 12/2007 | Mallary | |
| 2008/0084635 A1 | 4/2008 | Lee et al. | |

* cited by examiner

*Primary Examiner* — Holly Rickman (57) ABSTRACT

A discrete track perpendicular magnetic recording (PMR) disk and a method of fabricating the disk are described. The PMR disk may include a heat sink layer disposed above a substrate, intermediate layers disposed above the heat sink layer, and a magnetic recording layer disposed above the intermediate layers. The magnetic recording layer may have raised and recessed areas, where a heat conductive material may be disposed within one or more of the recessed areas.

14 Claims, 12 Drawing Sheets

ENERGY ASSISTED DISCRETE TRACK MEDIA WITH HEAT SINK

TECHNICAL FIELD

Embodiments described herein relate to the field of disk drives, and, in particularly, to perpendicular magnetic recording disks used in energy assisted magnetic recording drives.

BACKGROUND

In magnetic recording disks, increases in areal density have been accomplished by scaling down the area of a data bit by reducing the grain size of the magnetic particles in the recording medium. However, reducing the grain size of the magnetic particles also reduces the magnetic stability of the particles. At the superparamagnetic limit, the grain size of the magnetic particles become so small that spontaneous magnetic reversal under slight thermal agitation may occur. To counter this superparamagnetic limit, higher coercivity magnetic materials may be used in the recording medium. With the use of higher coercivity magnetic materials, the application of a strong magnetic field may be required during write operations to magnetize the recording medium. However, conventional magnetic write heads may not be able to provide the required magnetic field intensity due to physical limitations of the write heads.

In energy-assisted magnetic recording (EMR), the recording medium is locally heated to decrease the coercivity of the magnetic material during write operations. The local area is then rapidly cooled to retain the written information. This allows for conventional magnetic write heads to be used with high coercivity magnetic materials. The heating of a local area may be accomplished by, for example, a heat or thermal source such as a laser. As such, one type of energy-assisted magnetic recording is heat assisted magnetic recording (HAMR). HAMR may also sometimes be referred to as thermally assisted magnetic recording (TAMR) or optically assisted magnetic recording (OAMR).

Figure 1A:
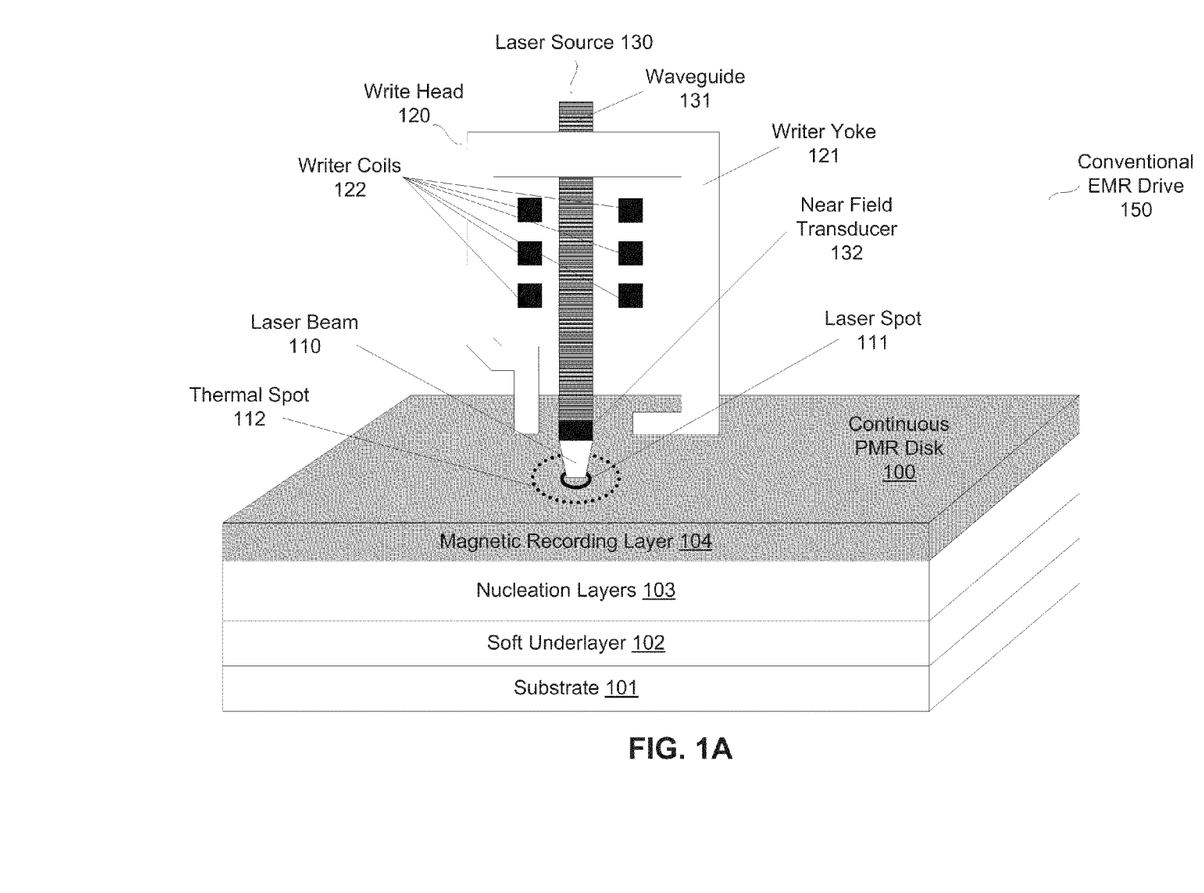
FIG. 1A shows a cross sectional view of a write head, a laser source, and a continuous perpendicular magnetic recording (PMR) disk in a conventional EMR disk drive.

FIG. 1A illustrates a cross sectional view of a write head 120, a laser source 130, and a continuous PMR disk 100 inside a conventional EMR drive 150. The PMR disk 100 may include a substrate 101, a soft underlayer 102, nucleation layers 103, and a magnetic recording layer 104. The write head 120 may include a writer yoke 121 and writer coils 122. The laser source 130 may include a waveguide 131 to generate a laser beam 110. A near-field transducer (NFT) 132 may be coupled to the waveguide 131 to focus the laser beam 110 into a laser spot 111 on a continuous PMR disk 100 during the write operation. The heat from the laser spot 111 may form a thermal spot 112, which represents the area that is locally heated during the write operation. Consequently, the minimum recording track width is determined by the size of the thermal spot 112, because if the recording tracks are made smaller than the thermal spot 112, then adjacent tracks may be inadvertently written due to thermal spreading of the thermal spot 112 into adjacent tracks.

For example, to achieve an areal density of 1 terabit per square inch, a thermal spot size of about 43 nanometers (nm) may be required. In conventional energy-assisted magnetic recording, the thermal spot 112 size may be reduced by reducing the laser spot 112 size through a reduction in the NFT 132 dimensions. To achieve the thermal spot 112 size of 43 nm with a continuous PMR disk 100, the NFT 132 dimension requirement is about 20 nm. As the areal density increases further, the minimum distance requirement for the NFT 132 approaches zero. This creates increasing difficulty in the lithographic process for manufacturing the NFT 132.

Figure 1B:
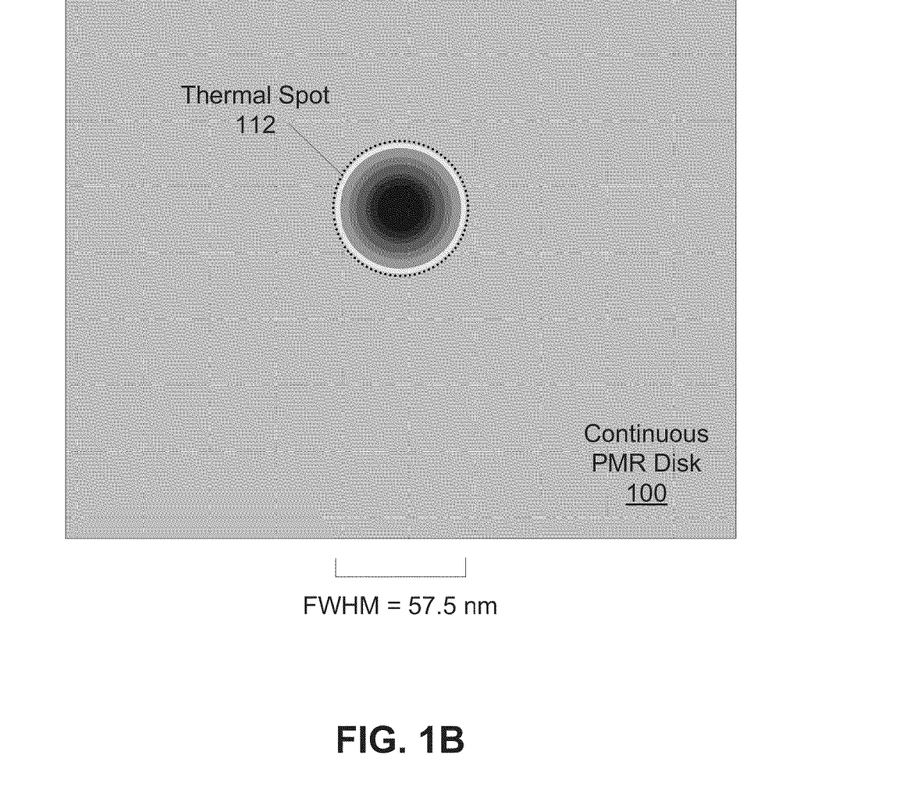
FIG. 1B shows a thermal spot on a continuous PMR disk in a conventional EMR disk drive.

FIG. 1B illustrates the thermal spot 112 size on a continuous PMR disk 100 in a conventional EMR drive 150 during a write operation. Inside the thermal spot 112, darker shading indicates hotter temperatures. In this particular example, the laser source 130 produces a laser spot 111 having a full-width half maximum (FWHM) of 40 nm. The resulting FWHM of the thermal spot 112 is about 57.5 nm, or close to 20 nm wider than the laser spot 111. This thermal spreading in the conventional EMR drive 150 may be due to the poor thermal conductivity of the intermediate layers 103 of the PMR disk 100.

To reduce the thermal spreading to adjacent tracks in EMR, different disk structures have been developed and discussed, for example, in U.S. Patent Application, 2006/0210838 A1 to Kamimura et al. (hereinafter "Kamimura") and U.S. Patent Application 2007/0279791 A1 to Mallary (hereinafter "Mallary"). In Kamimura, heat conductive grooves are sunken into the substrate from the magnetic recording layer to assist with dissipating heat from the disk surface into the substrate. However, the depth of the grooves being all the way down into the substrate may pose challenges in fabrication and in uniform deposition of the heat conductive material into the grooves.

In Mallary, air gaps are formed in grooves that extend down to the soft underlayer. A thermal insulator layer is also inserted above the soft underlayer. However, the use of air gaps above a thermal insulator layer may slow the propagation of heat out of the magnetic recording layer. This may increase the cooling time for a previously written area. As a result, the previously written area may be inadvertently erased if the same area is subsequently exposed to a magnetic field before sufficient cooling has occurred.

BRIEF DESCRIPTION OF THE DRAWINGS

The present invention is illustrated by way of example, and not limitation, in the figures of the accompanying drawings in which.

DETAILED DESCRIPTION

Embodiments are described herein with reference to figures. However, particular embodiments may be practiced without one or more of these specific details, or in combination with other known methods, materials, and apparatuses. In the following description, numerous specific details are set forth, such as specific materials, dimensions and processes parameters etc. to provide a thorough understanding. In other instances, well-known manufacturing processes and equipment have not been described in particular detail to avoid unnecessarily obscuring the claimed subject matter. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment. Furthermore, the particular features, structures, materials, or characteristics may be combined in any suitable manner in one or more embodiments.

Embodiments of a discrete track, perpendicular magnetic recording (PMR) disk for energy-assisted magnetic recording and a method of fabricating the PMR disk are described. The PMR disk may be used in a disk drive system that may include a heat source such as a laser to locally heat the disk during write operations. In one embodiment, the PMR disk may include the following layers: a substrate, a heat sink layer, intermediate layers, and a magnetic recording layer. The intermediate layers may, for example, include a soft underlayer and nucleation layers. The PMR disk topography may have raised and recessed areas formed on the disk surface. In one embodiment, the recessed areas may extend from the disk surface down to a depth within the magnetic recording layer. In alternative embodiments, the recessed areas may extend down to the soft underlayer or to any depth in between. In one embodiment, at least one or more of the recessed areas are filled with a heat sink material.

Figure 2A:
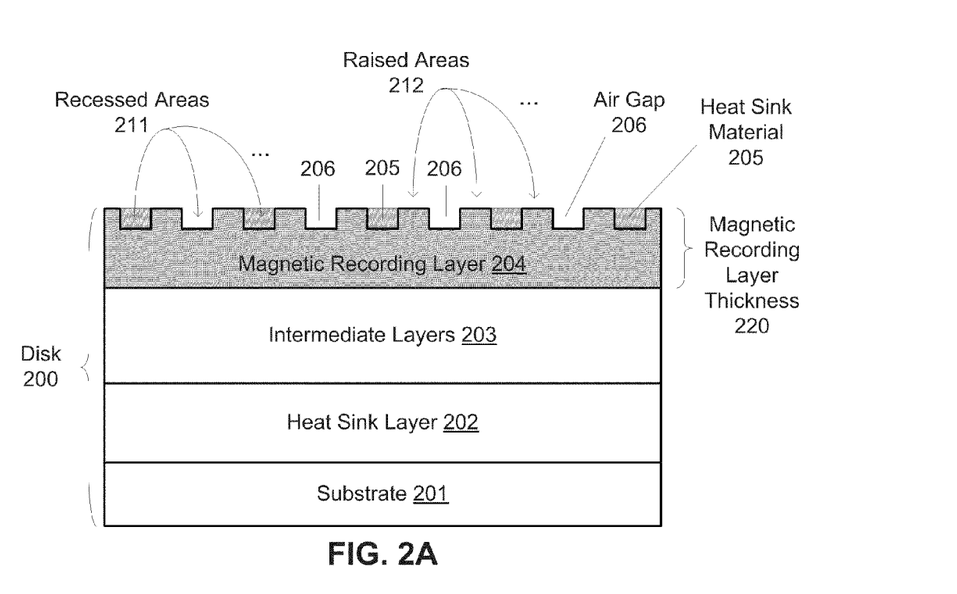
FIG. 2A illustrates the cross sectional view of a PMR disk according to one embodiment of the present invention, where recessed areas are alternately filled with an air gap and a heat conductive material.
Figure 2B:
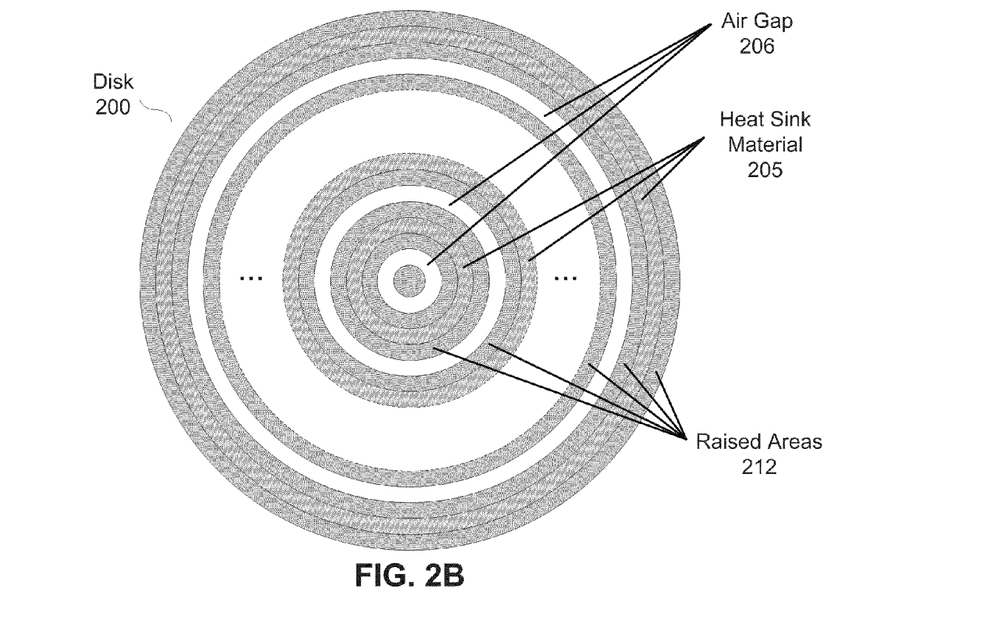
FIG. 2B illustrates the top view of a PMR disk according to one embodiment of the present invention, where recessed areas are alternately filled with an air gap and a heat conductive material.

FIG. 2A illustrates a cross-sectional view of one embodiment of a PMR disk 200. FIG. 2B illustrates the corresponding top view of the PMR disk 200 of FIG. 2A. Additional or intervening layers that are not shown may be present in alternative embodiments. In one embodiment, the PMR disk 200 may include a substrate 201. The substrate 201 may be made of, for example, a metal, metal alloys such as nickel phosphorous (NiP), glass, or other substrate materials known in the art including polymers and ceramics. The PMR disk 200 may include a heat sink layer 202 disposed above the substrate 201. In one embodiment, the heat sink layer 202 may be made of copper (Cu). In other embodiments, other metals or heat conductive materials may be used. In one exemplary embodiment, the heat sink layer 202 may have a thickness of about 100 nanometers (nm). The heat sink layer 202 may have intermediate layers 203 disposed above the heat sink layer 202. In one embodiment, the intermediate layers 203 may have a thickness of about 30 nm. Alternatively, the heat sink layer 202 and intermediate layers 203 may have other dimensions in other embodiments. In some embodiments, the heat sink layer 202 thickness may vary depending on the heat conductivity of the material used in the heat sink layer 202.

The PMR disk 200 may further include a magnetic recording layer 204 disposed above the intermediate layers 203. The magnetic layer 204 may be made of, for example, an iron platinum alloy. In other embodiments, other magnetic alloys may be used. In addition, the PMR disk 200 may include raised areas 212 and recessed areas 211 formed on the disk 200 surface. In one embodiment, the recessed areas 211 may extend from the disk 200 surface down to a depth within the magnetic recording layer 204. In one exemplary embodiment, the magnetic recording layer 204 may have a thickness 220 of about 10 nm. In a particular embodiment, the recessed areas 211 may extend down from the disk surface to a depth of about 25 percent of the magnetic recording layer thickness 220. In other embodiments, the magnetic recording layer thickness 220 may have other dimensions, and the recessed areas 211 may extend down to different depths.

In one embodiment, at least one of the recessed areas 211 may be filled with a heat sink material 205. The heat sink material 205 may be made of a metal, for example, Cu, silver or gold, or metal alloys. In other embodiments, the heat sink material 205 may be made of diamond like carbon (DLC). Alternatively, the heat sink material 205 may be a material with a heat conductance greater than 100 Watts per meters Kelvin (W/mK). The heat sink material 205 may be a different material than the material used in the heat sink layer 202. In a particular embodiment, at least one of the adjacent recessed areas 211 of the raised areas 212 is filled with the heat sink material 205. The recessed areas 211 that are not filled with the heat sink material may, for example, have an air gap 206. The resulting PMR disk 200 may have a topography as shown in FIG. 1B. In this exemplary embodiment, the recessed areas 211 may be alternately filled with heat sink material 205 on one side of the raised areas 212 and air gap 206 on the other side of the raised areas 212.

Figure 3A:
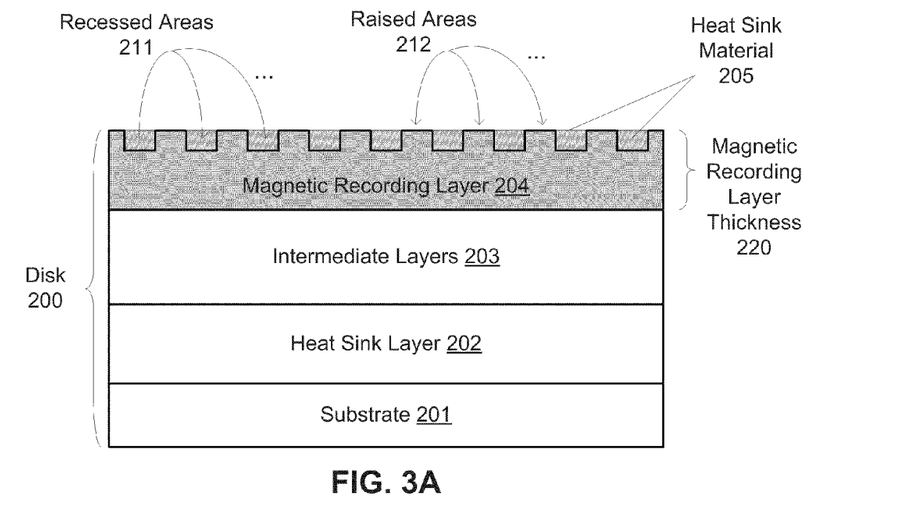
FIG. 3A illustrates the cross sectional view of PMR disk according to one embodiment of the present invention, where all recessed areas are filled with a heat conductive material.
Figure 3B:
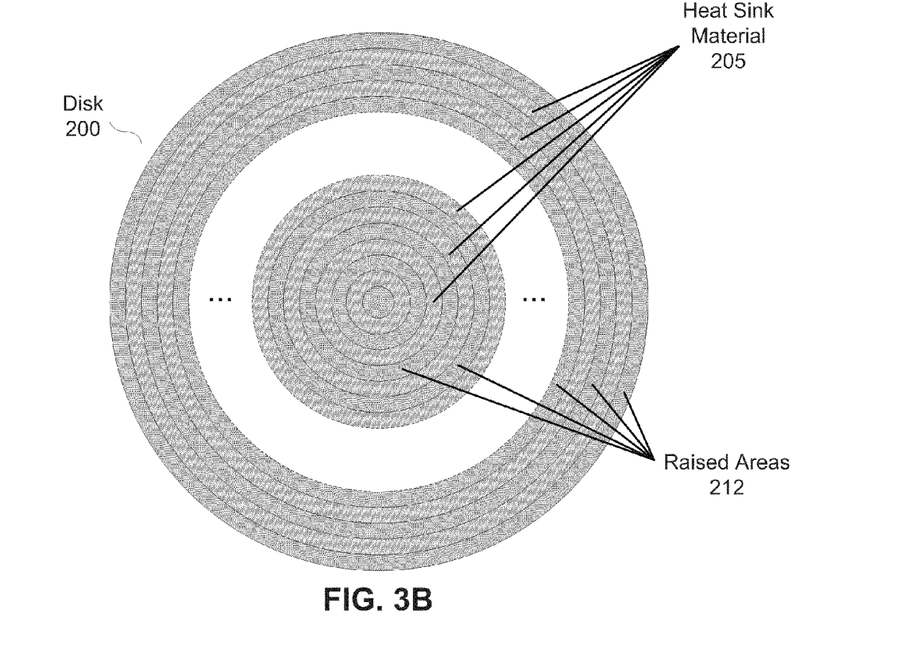
FIG. 3B illustrates the top view of a PMR disk according to one embodiment of the present invention, where all recessed areas are filled with a heat conductive material.

FIG. 3A shows the cross section of a different embodiment of a PMR disk 200. FIG. 3B illustrates the corresponding top view of the PMR disk 200 of FIG. 3A. In this embodiment, all recessed areas 211 are filled with a heat sink material 205. The recessed areas 211 may extend down from the disk surface to a depth of about 25 percent of the magnetic recording layer thickness 220. In other embodiments, the recessed areas 211 may extend down to different depths. The resulting PMR disk 200 may have a topography as shown in FIG. 2B. In this exemplary embodiment, the recessed areas 211 are filled with heat sink material 205 on both sides of the raised areas 212.

Figure 4A:
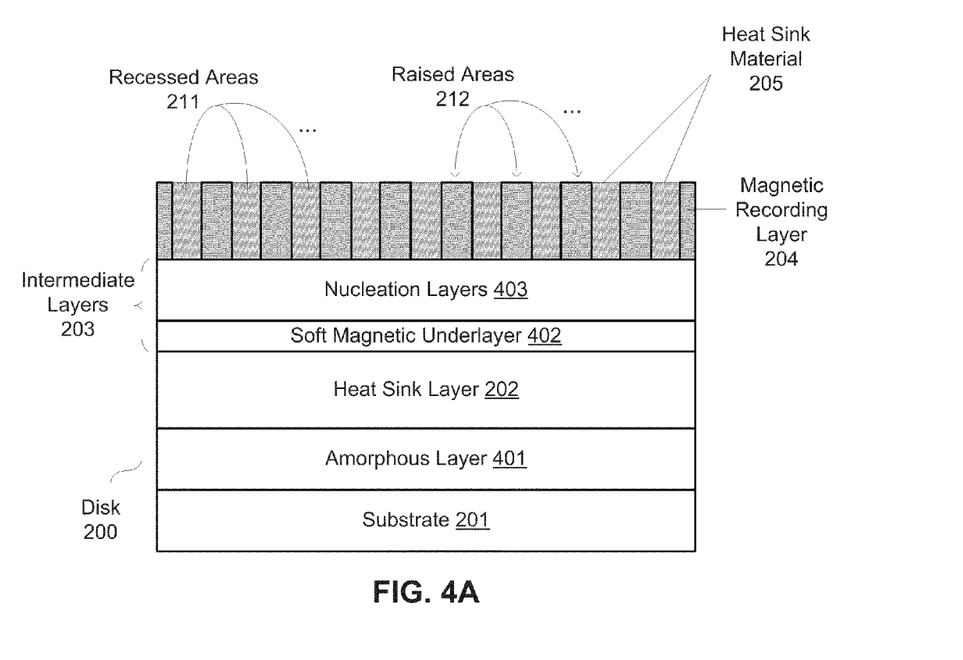
FIG. 4A illustrates the cross sectional view of a PMR disk and exemplary intermediate layers according to one embodiment of the present invention, where the recessed areas extend through the magnetic recording layer.
Figure 4B:
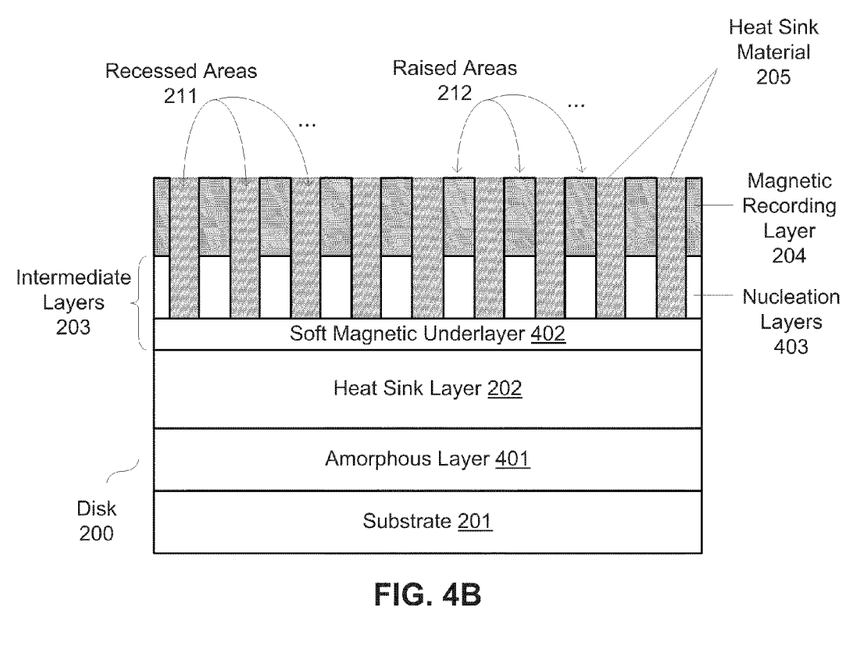
FIG. 4B illustrates the cross sectional view of a PMR disk and exemplary intermediate layers according to one embodiment of the present invention, where the recessed areas extend down to the soft magnetic underlayer.

FIG. 4A and FIG. 4B show the cross sections of alternative embodiments of a PMR disk 200 and exemplary intermediate layers 203. In this embodiment, the PMR disk 200 may include an intervening amorphous layer 401 disposed between the heat sink layer 202 and the substrate 201. The amorphous layer 401 may be a seed layer made of, for example, tantalum (Ta). In one embodiment, the intermediate layers 203 may include a soft magnetic underlayer 402 and nucleation layers 403 disposed above the soft magnetic underlayer 402. The nucleation layers 403 may include different layers, and each layer may be made from one of, for example, Ta, chromium ruthenium (CrRu), or magnesium oxide (MgO). In alternative embodiments, the amorphous layer 401 and the intermediate layers 203 may have other compositions and additional intervening layers.

In one embodiment, the recessed areas 211 may extend completely through the magnetic recording layer 204 as shown in FIG. 4A. In another embodiment, the recessed areas 211 may extend, for example, through the nucleation layers 403 down to the magnetic soft underlayer 402 as shown in FIG. 4B. At least one of the recessed areas 211 may be filled with a heat sink material 205, as described above. In an exemplary embodiment, every other recessed areas 211 may be filled with a heat sink material 205 with the remaining recessed areas 211 filled with an air gap 206. Alternatively and as shown in FIG. 4A and FIG. 4B, all recessed areas 211 may be filled with a heat sink material 205.

Figure 5:
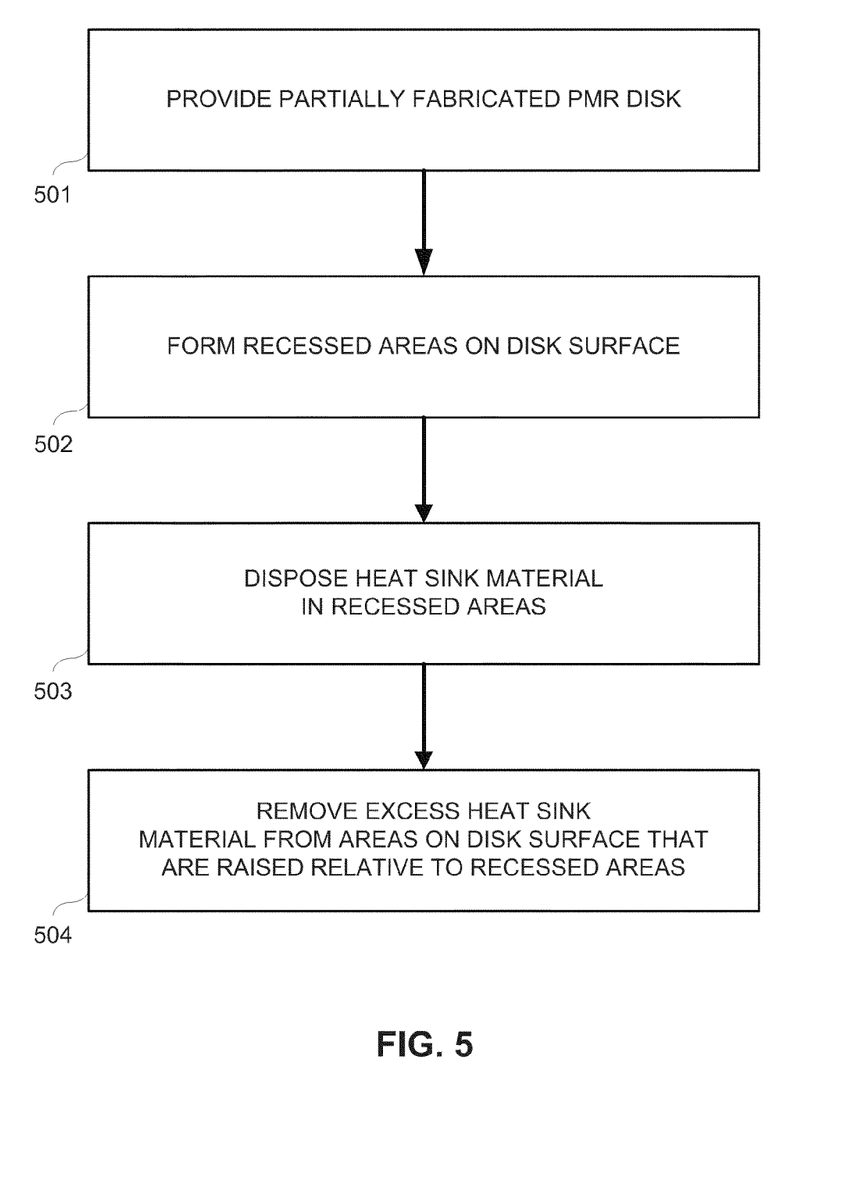
FIG. 5 illustrates the fabrication of a PMR disk according to one embodiment of the present invention.
Figure 6A:
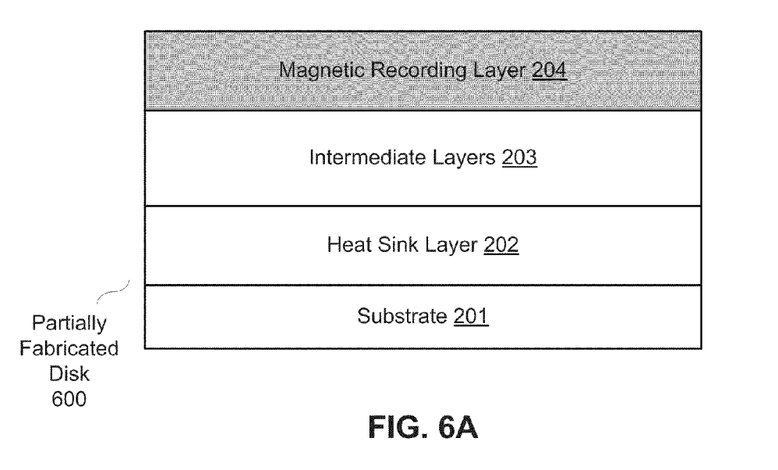
FIG. 6A shows a partially fabricated PMR disk according to one embodiment of the present invention.

FIG. 5 outlines one embodiment of the manufacturing operations to fabricate a PMR disk 200 for energy assisted magnetic recording. FIG. 6A through FIG. 6D illustrate the cross sectional views of the resulting disk structure after each operation. The manufacturing of the PMR disk 100 may start in operation 501 with, for example, a partially fabricated PMR disk 600 having a substrate 201, a heat sink layer 202, intermediate layers 203, and a magnetic recording layer 204 as shown in FIG. 6A. The deposition of the various layers including the heat sink layer 202, the intermediate layers 203, and the magnetic recording layer 204 may be accomplished by a variety of methods well known in the art, for example, sputtering, chemical vapor deposition, or ion-beam deposition.

Figure 6B:
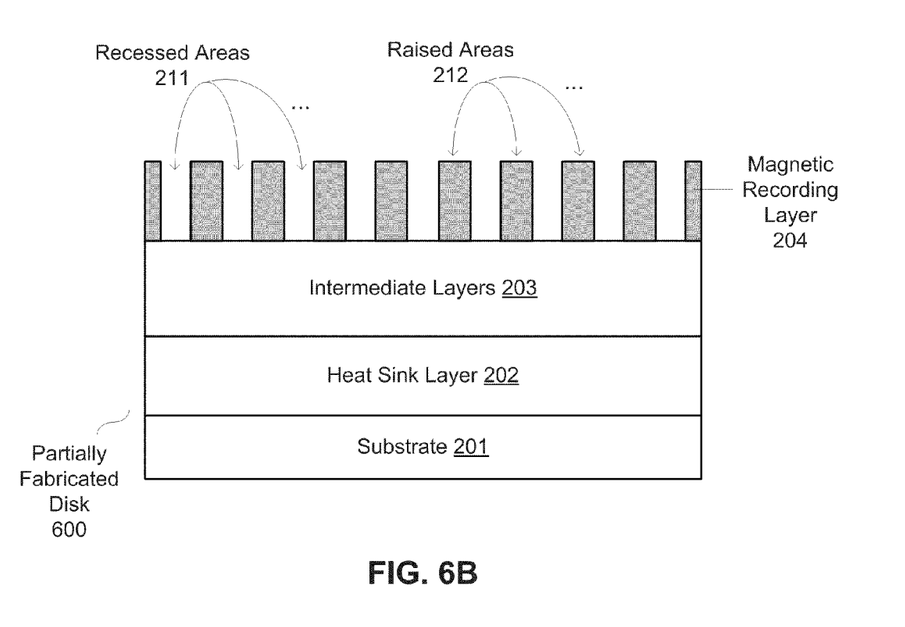
FIG. 6B shows a partially fabricated PMR disk with recessed areas formed on the disk surface according to one embodiment of the present invention.

In operation 502, recessed areas 211 on the disk surface may be formed in the magnetic recording layer 204. In one embodiment, the recessed areas 211 may extend down through the magnetic recording layer 204 as shown in FIG. 6B. In alternative embodiments, the recessed areas 211 may extend down to different depths as described above. These recessed areas 211 may be formed by, for example, commonly used etching techniques including reactive ion etching, focused ion beam, or ion milling (or sputter).

Figure 6C:
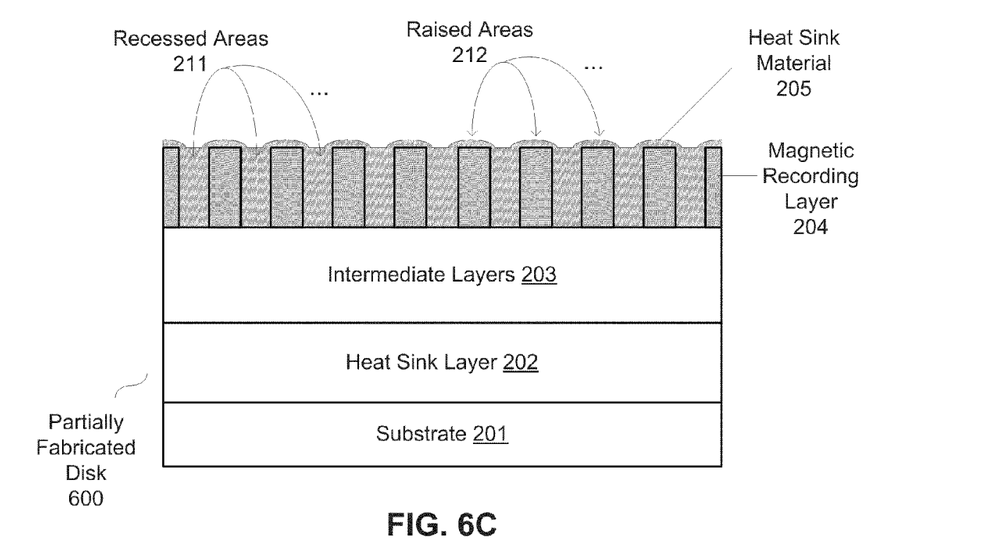
FIG. 6C shows a partially fabricated PMR disk after deposition of a heat sink material according to one embodiment of the present invention.

In operation 503, a heat sink material 205 may be disposed into at least one of the recessed areas 211. The heat sink material 205 may be a metal such as copper, or any one of the materials discussed above. The heat sink material 205 may be disposed into the recessed areas 211 by plating the heat sink material 205 onto the magnetic recording layer 204 to fill the recessed areas 211. In one embodiment, the recessed areas 211 to be filled with an air gap 206 may be masked off during operation 503 when the heat sink material 205 is disposed into the unmasked areas. In an alternative embodiment, all recessed areas 211 are exposed during operation 503, and the heat sink material 205 is disposed into all of the recessed areas 211 as shown in FIG. 6C.

Figure 6D:
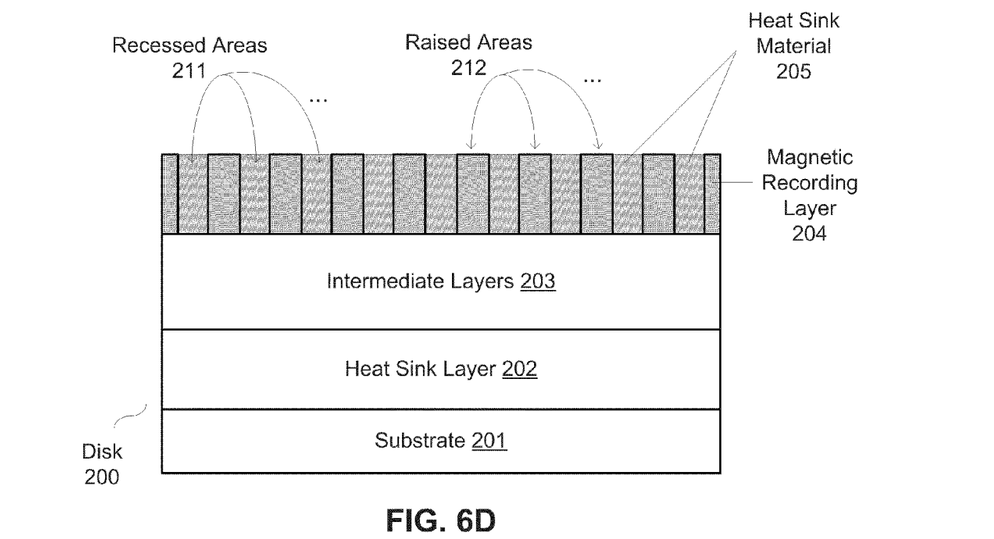
FIG. 6D shows a resulting PMR disk after removal of excess heat sink material according to one embodiment of the present invention.

During operation 503, excess heat sink material 205 may have been deposited onto the raised areas 212 of the disk surface. In operation 504, the excess heat sink material 205 on the raised areas 212 are removed. In one embodiment, a chemical mechanical polish may be used to remove the excess heat sink material 205. Alternatively, other planarization operations may be used. One exemplary embodiment of the resulting PMR disk 200 structure, after processing of the heat sink material 205, is shown in FIG. 6D. It should be noted that PMR disk 200 may have additional layers above the magnetic recording layer 204, for example, protection layers and lubrication layers. It should also be noted that, in alternative embodiments, the PMR disks may have fewer or different layers than in the illustrated embodiments. In one alternative embodiment, for example, the PMR disk may not include an SUL.

The PMR disk 200 may be used in an energy-assisted recording (EMR) drive. Alternatively, the PMR disk 200 may also be used in other non-EMR drives such as PMR drives with inductive write heads.

Embodiments of the methods described above may be used to fabricate a PMR disk. In particular embodiments, both sides of the substrate may be processed, in either simultaneous or consecutive fashion, to form disks with double sided patterns.

Figure 7A:
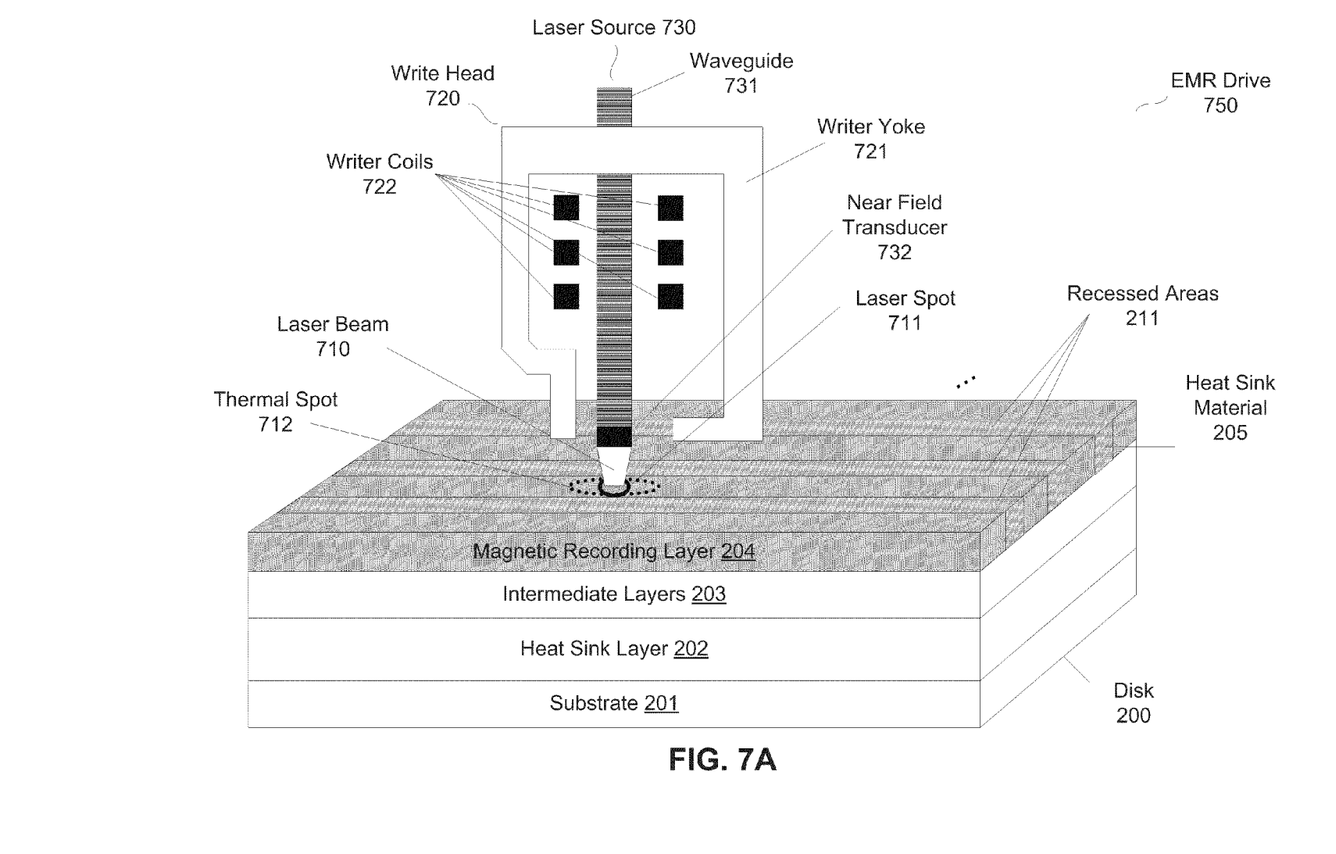
FIG. 7A shows a cross sectional view of a write head, a laser source, and a PMR disk in an EMR disk drive according to one embodiment of the present invention.

FIG. 7A illustrates a cross sectional view of a write head 720, a laser source 730 with a PMR disk 200 inside an EMR drive 750 according to one embodiment of the present invention. The EMR drive 750 may be a heat assisted magnetic recording (HAMR) drive. HAMR may also sometimes be referred to as thermally assisted magnetic recording (TAMR) or optically assisted magnetic recording (OAMR). The write head 720 may include a writer yoke 721 and writer coils 722. The write head 720 may be similar to conventional EMR write heads. The components of the laser source 730 may include a waveguide 731 and a near-field transducer (NFT) 732. Techniques in generating a laser beam 710 and focusing the laser beam 710 with NFT 732 are known in the art, and thus, are not described in particular details. The PMR disk 200 may include recessed areas 211 formed on the disk surface. In this embodiment, all recessed areas are filled with a heat sink material 205, and the recessed areas 211 extend through the entire magnetic recording layer 204. In alternative embodiments, one or more of the recessed areas 211 may be filled with a heat sink material 205, and the recessed areas 211 may extend down to different depths.

Figure 7B:
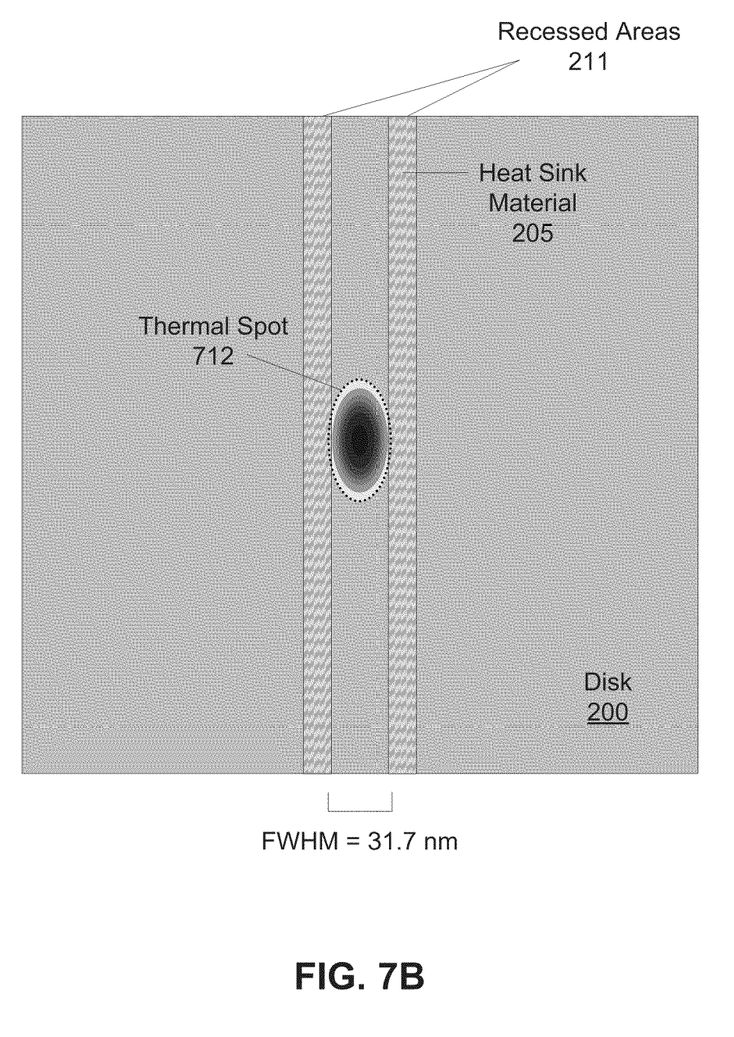
FIG. 7B shows a thermal spot on a PMR disk in an EMR disk drive according to one embodiment of the present invention.

FIG. 7B illustrates the thermal spot 712 on a PMR disk 200 in the EMR drive 750 of FIG. 7A during a write operation. In this exemplary embodiment, the laser source 730 may produce a laser spot 711 having the same full-width half maximum (FWHM) of 40 nm as the conventional EMR drive 150 of FIG. 1A, but the resulting FWHM of the thermal spot 712 may be reduced to about 31.7 nm as shown in FIG. 7B. In this particular embodiment, the thermal spot 712 has a width of about 80 percent of the FWHM of the laser spot 711. In alternative embodiments, the thermal spot 712 may have a width in a range of 80 to 150 percent of the FWHM of the laser spot 711.

When the energy from the laser beam 710 is deposited onto an isotropic high thermal conductivity material such as the heat sink material 205, the material may more efficiently dissipate the heat down into the intermediate layers 203 and the heat sink layer 202. In other embodiments, the reduction in the thermal spot 712 size may be directly proportional to the depth of the recessed areas 211 through the disk 200. The presence of the heat sink material 205 may also dissipate heat more quickly to prevent erasure of previously written transitions. For example, in one embodiment, where all recessed areas 211 extend through the magnetic recording layer 204 and are filled with heat sink material 205, the cooling rate may be about 500 degrees Kelvin per nanosecond (deg/ns) as compared to about 340 deg/ns in continuous PMR disk 100.

As illustrated, the EMR disk drive 750 may allow a smaller thermal spot 712 size for the same laser spot 711 size as compared to conventional EMR drives. In an exemplary embodiment, the thermal spot 712 size is reduced from 57.5 nm down to 31.7 nm for a 40 nm laser spot 711 size. This reduction of the thermal spot 712 size may relax the minimum distance requirements for the NFT 732 to achieve a thermally confined thermal spot 712 on the recording medium. As a result, this relaxation of NFT 732 requirements may improve head yield and design tolerances. Additionally, this may allow for higher areal density to be achieved in EMR drives.

Figure 8:
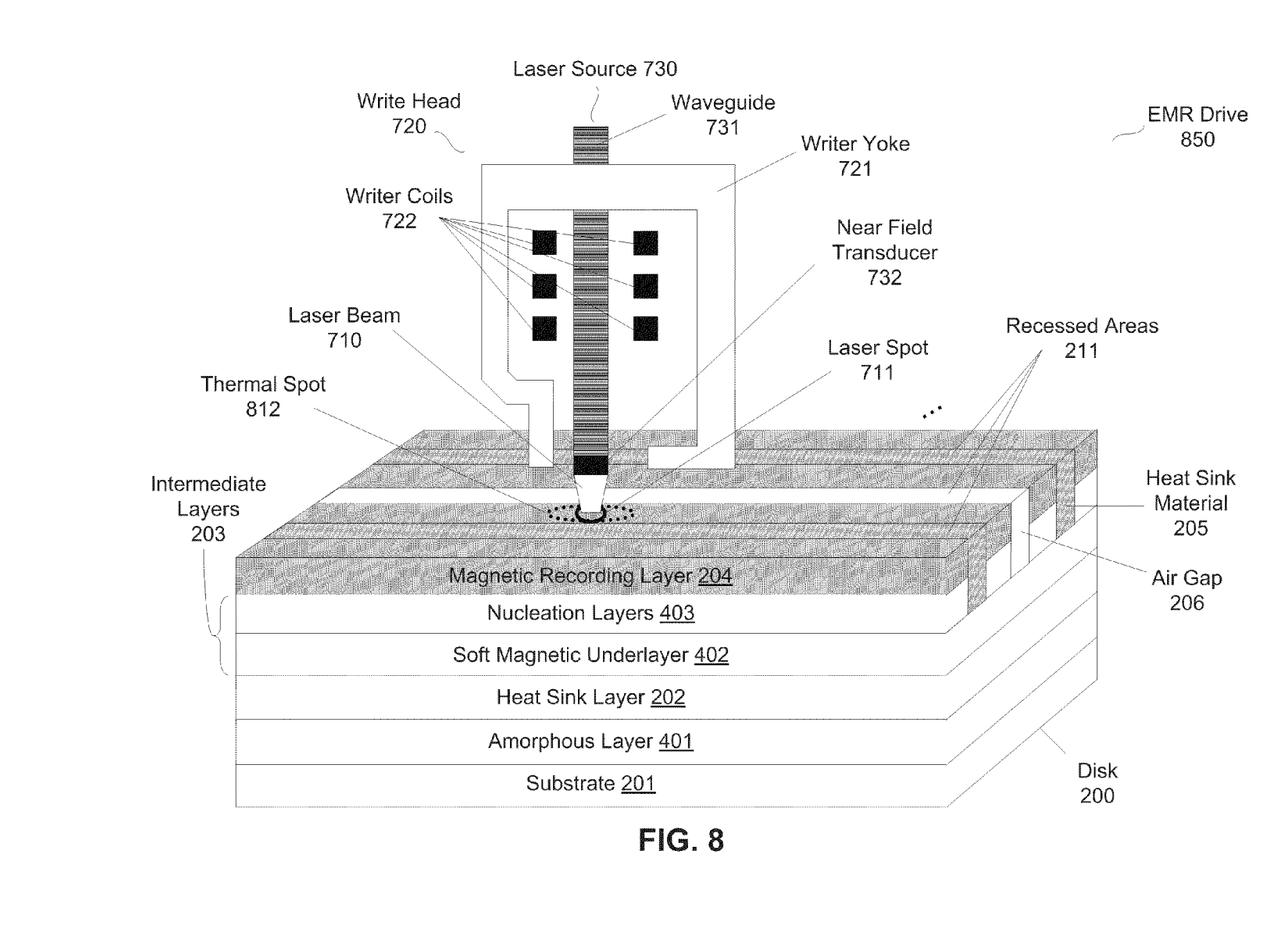
FIG. 8 shows a cross sectional view of a write head, a laser source, and a PMR disk in an EMR disk drive according to another embodiment of the present invention.

FIG. 8 illustrates a cross sectional view of a write head 720, a laser source 730 with a PMR disk 200 inside an EMR drive 850 according to an alternative embodiment. In this alternative embodiment, the PMR disk 200 may include an amorphous layer 401. Intermediate layers 203 may include a soft magnetic underlayer 402 and nucleation layers 403. The recessed areas 211 of PMR disk 200 may extend down to 25% of the magnetic recording layer 204, or down to the soft magnetic underlayer 402. In other embodiments, the recessed areas 211 may extend to any depth in between. In this embodiment, the recessed areas 211 may alternately be filled with a heat sink material 205 and an air gap 206.

It should be noted that the apparatus and methods discussed herein may be used with various types of drives. In one embodiment, for example, the apparatus and methods discussed herein may be used with a non-EMR disk drive such as a PMR drive with inductive write heads.

The terms "over," "under," "between," and "on" as used herein refer to a relative position of one layer with respect to other layers. As such, for example, one layer deposited or disposed over or under another layer may be directly in contact with the other layer or may have one or more intervening layers. Moreover, one layer deposited or disposed between layers may be directly in contact with the layers or may have one or more intervening layers. In contrast, a first layer "on" a second layer is in contact with that second layer. Additionally, the relative position of one layer with respect to other layers is provided assuming the initial disk is a starting substrate and the subsequent processing deposits, modifies and removes films from the substrate without consideration of the absolute orientation of the substrate. Thus, a film that is deposited on both sides of a substrate is "over" both sides of the substrate.

In the foregoing specification, the present invention has been described with reference to specific exemplary embodiments thereof. It will, however, be evident that various modifications and changes may be made thereto without departing from the broader scope of the embodiments of the invention as set for in the appended claims. The specification and drawings are, accordingly, to be regarded in an illustrative rather than a restrictive sense.

What is claimed is:

1. A perpendicular magnetic recording (PMR) disk, comprising:
a substrate;
a heat sink layer being different than the substrate and disposed above the substrate;
a plurality of intermediate layers disposed above the heat sink layer;
a magnetic recording layer disposed above the plurality of intermediate layers, the magnetic recording layer having a plurality of raised areas and recessed areas formed therein;
a heat sink material disposed within one or more of the plurality of recessed areas; and
an amorphous layer disposed between the substrate and the heat sink layer, wherein the substrate comprises glass, the heat sink layer comprises copper and the amorphous layer comprises tantalum.

2. The PMR disk of claim 1, wherein the heat sink material is disposed in all of the plurality of recessed areas.

3. The PMR disk of claim 1, wherein the magnetic recording layer has a top surface and a thickness, and wherein the recessed areas extend down from the top surface at least 25 percent of the thickness of the magnetic recording layer.

4. The PMR disk of claim 3, wherein the recessed areas extend completely through magnetic recording layer.

5. The PMR disk of claim 3, wherein one of the plurality of intermediate layers comprises a soft magnetic underlayer (SUL) and wherein the recessed areas extend down through one or more of the plurality of intermediate layers to the SUL.

6. The PMR disk of claim 5, wherein the one or more of the plurality of intermediate layers through which the recessed areas extend comprise nucleation layers.

7. The PMR disk of claim 1, wherein the heat sink material disposed within the plurality of recessed areas comprises a metal.

8. The PMR disk of claim 1, wherein the heat sink material disposed within the plurality of recessed areas comprises a metal alloy.

9. The PMR disk of claim 1, wherein the heat sink material disposed within the plurality of recessed areas comprises copper.

10. The PMR disk of claim 1, wherein the heat sink material disposed within the plurality of recessed areas comprises diamond like carbon (DLC).

11. The PMR disk of claim 1, wherein the heat sink material disposed within the plurality of recessed areas comprises silver.

12. The PMR disk of claim 1, wherein the heat sink material disposed within the plurality of recessed areas comprises gold.

13. The PMR disk of claim 1, wherein the heat sink material disposed within the plurality of recessed areas has a conductivity greater than 100 Watts per meter Kelvin.

14. A perpendicular magnetic recording (PMR) disk, comprising:
a substrate;
a heat sink layer being different than the substrate and disposed above the substrate;
a plurality of intermediate layers disposed above the heat sink layer;
a magnetic recording layer disposed above the plurality of intermediate layers, the magnetic recording layer having a plurality of raised areas and recessed areas formed therein; and
a heat sink material disposed within one or more of the plurality of recessed areas, wherein each raised area is surrounded by a first adjacent recessed area and a second adjacent recessed area being on opposite sides of a raised area, and wherein at least one of the first and second adjacent recessed areas has the heat sink material disposed therein, and wherein the other one of the first and second adjacent recessed areas comprises an air gap.

* * * * *